Feb. 6, 1962 K. MÜRRLE 3,019,595
INERTIA WOUND WATCH WITH OVERWIND PREVENTER
Filed Aug. 6, 1958 2 Sheets-Sheet 1
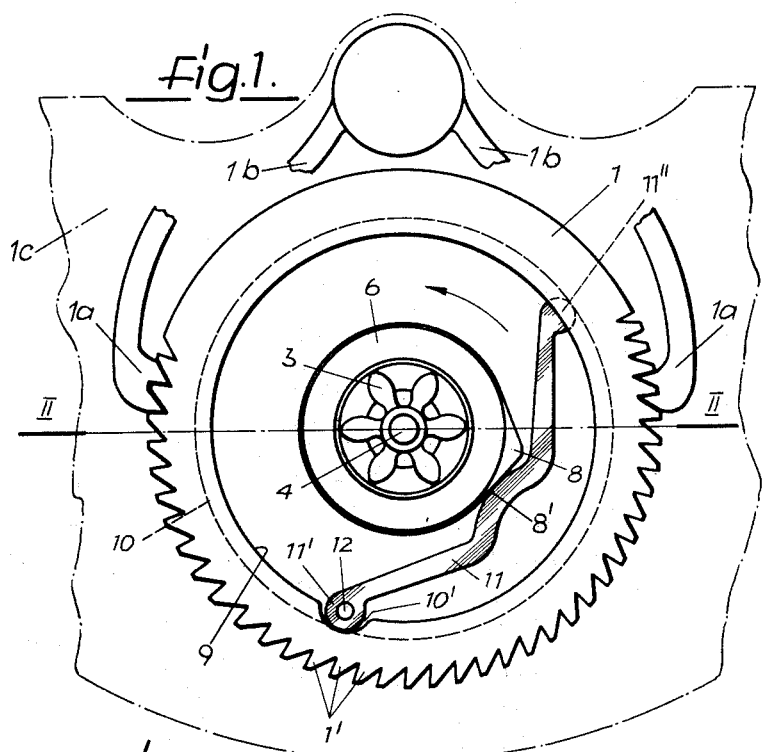
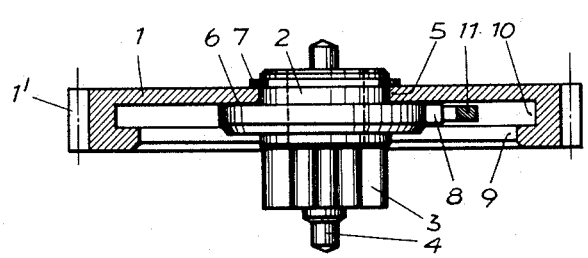
Inventor:
Kurt Mürrle
By Watson, Cole, Grindle & Watson
Attys.

United States Patent Office 3,019,595
Patented Feb. 6, 1962

3,019,595
INERTIA WOUND WATCH WITH OVERWIND PREVENTER
Kurt Mürrle, Osterfeldstrasse 35, Pforzheim, Germany
Filed Aug. 6, 1958, Ser. No. 753,515
Claims priority, application Germany Aug. 20, 1957
2 Claims. (Cl. 58—82)

The present invention relates to improvements in automatic or self-winding mechanisms, particularly for wrist watches.

In watches of this type, the natural movements of the arm of a person wearing the watch are utilized to move a flyweight within the watch casing, and the movements of this flyweight are then transmitted to a ratchet wheel to turn the same in only one direction, while such rotary movement of the latter is then transmitted to a pinion which winds the main spring of the watch. Since a positive connection between this ratchet wheel and pinion might easily lead to an overwinding of the main spring, it is advisable to interpose some sort of a clutch which disengages the main-spring pinion from the ratchet wheel when the watch has been wound sufficiently.

In my Patent No. 2,928,231 issued March 15, 1960, I have described a device of this kind which consists of a friction clutch which is interposed between the mentioned ratchet wheel and the hub of the pinion which drives the gear which, in turn, acts upon the main spring to wind the same. This friction clutch consists of an annular surface on the ratchet wheel which extends transversely to the common axis of the latter and of the mentioned pinion, and of a spring member which is mounted on the ratchet wheel and presses an annular surface on the hub of the pinion in the axial direction against the annular surface of the ratchet wheel.

In order to insure that the resilient pressure exerted by the spring of such a friction clutch upon the hub of the pinion will be great enough to drive the gear which, in turn, winds the main spring, it is necessary to make this spring of a very accurate resilient strength since otherwise it would either slip too easily and would then not insure that the main spring will be wound sufficiently or it would be too strong and would then not prevent the watch from being overwound and from then running too fast.

It is the principal object of the present invention to provide a new clutch mechanism, particularly for automatically wound wrist watches, which overcomes the above-mentioned disadvantage of my own prior invention and of other friction clutches previously designed for similar purposes.

A further object of the present invention is to provide a new clutch mechanism which may either be applied in place of a friction clutch which is operated by an axial pressure, for example, of the type as disclosed in my mentioned copending application, or in combination with such a friction clutch.

When the new clutch mechanism is to be applied in combination with such a friction clutch operating by axial pressure, it is a further object of the invention to design this mechanism so as to permit it to be easily installed in a finished time piece which already contains such a friction clutch, without requiring any substantial changes therein.

According to the present invention, the new clutch mechanism consists of a rod-shaped spring which is connected to the ratchet wheel which is driven by the flyweight, and of a cam which is mounted on a shaft which, in turn, drives the shaft carrying the main spring. When the ratchet wheel is driven by the flyweight, this rod-shaped spring engages with the cam and thus transmits the winding movement of the ratchet wheel to the main spring by taking along the cam. This rod-shaped spring is made of such a strength that it will yield under the resistance of the cam when the main spring is sufficiently wound, and will thus prevent the main spring from being further wound, even though the ratchet wheel continues to rotate.

The cam may be secured to the shaft which carries the pinion which engages with the gear acting upon the shaft of the main spring, and it is preferably secured to the hub of this pinion, while the rod-shaped spring preferably extends substantially in the direction of a secant of the ratchet wheel.

If applied to a self-winding mechanism which is provided with a friction clutch according to my mentioned copending application, the spring of such a friction clutch may be reduced in strength as compared to the instance when it is used without the rod-shaped spring according to the present invention, and it may then be designed so that when the main spring is wound to a certain extent and offers an increasing resistance, this spring will allow the friction clutch to slip before the rod-shaped spring will yield to the pressure of the cam.

If the spring of the friction clutch is star-shaped, and its annular part engages with the hub of the gear which is slidably mounted centrally within the ratchet wheel, while its radially projecting arms engage under tension in an annular groove within the inner periphery of the ratchet wheel, the rod-shaped spring may be mounted so that its ends likewise engage into this annular groove.

Further objects, features, and advantages of the present invention will be apparent from the following detailed description, particularly when read with reference to the accompanying drawings, in which:

FIGURE 1 shows a plan view of a clutch of an automatic winding mechanism according to the present invention without a friction clutch as disclosed in my prior copending application;

FIGURE 2 shows a cross section taken along line II—II of FIGURE 1;

FIGURE 3 shows a plan view of a clutch mechanism according to the invention which is combined with a friction clutch of an automatic winding mechanism as disclosed in my said Patent No. 2,928,231, while

Figure 3:
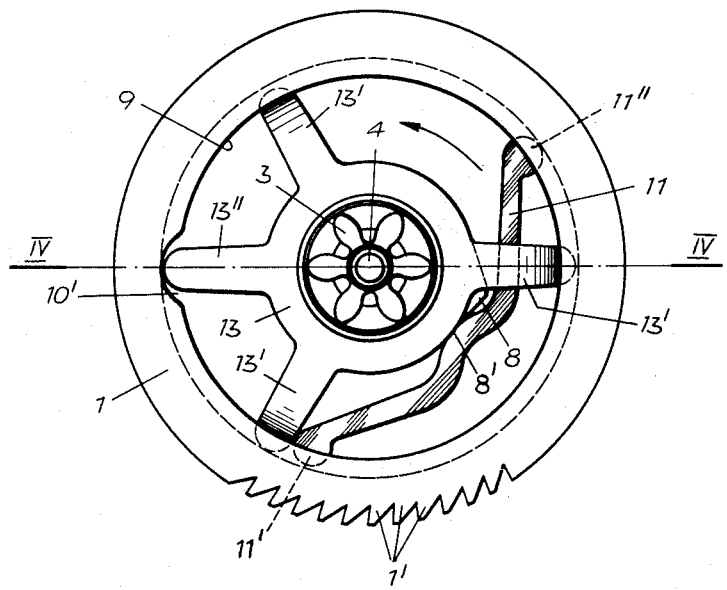

Referring to the drawings, and first particularly to FIGURES 1 and 2, the automatic winding mechanism of a wrist watch may be of the type as described and illustrated in my said Patent No. 2,928,231, and it includes a ratchet wheel 1 with teeth 1' which may be turned in only one direction by a pair of pawls 1a on arms 1b which are actuated by the oscillating movements of a flyweight 1c which are caused by the natural movements of the arm of a person wearing the watch. Ratchet wheel 1 is rotatably mounted on the hub 2 of a pinion 3 which engages with the driving wheel of the core of the main spring of the watch, not shown. Thus, shaft 4 of pinion 3 also forms the shaft of ratchet wheel 1. Hub 2 passes through a central aperture 5 in ratchet wheel 1, and an axial movement between ratchet wheel 1 and hub 2 is prevented by an annular flange 6 on hub 2 and a spring ring 7 engaging into a groove in the outer end of the hub. Flange 6 has a cam 8 rigidly secured thereto or integral therewith.

Ratchet wheel 1 has a large central recess 9 with an annular groove 10 in the inner wall thereof. This annular groove 10 contains the outer ends 11' and 11" of a rod-shaped spring 11 which is made of a length so as to extend substantially in the direction of a secant of ratchet wheel 1.

For inserting spring 11 into groove 10, the wall thereof is provided with a small notch 10' permitting one end of the spring or both ends to be inserted one after the other into groove 10. After the spring has been inserted into groove 10, the spring end 11' is secured to ratchet wheel 1 by means of a pin 12 or the like. The basic shape of spring 11 is substantially arcuate with the arc extending in a direction intermediate the secant and the arc of the corresponding circle. At its center, spring 11 is bent outwardly in the opposite direction to provide a bulge 8' which is adapted to engage with cam 8 on flange 6. When the movement of flyweight 1c is transmitted through pawls 1a to ratchet wheel 1 and the latter is turned in a counterclockwise direction as indicated in FIGURE 1, by the arrow, bulge 8' on spring 11 presses against cam 8 and takes along the latter and thus also turns pinion 3 to wind the main spring of the watch. After the main spring has been sufficiently wound, cam 8 will resist being taken along by bulge 8' on spring 11 with the result that, when ratchet wheel 1 is further turned in the direction of the arrow, spring 11 will bend outwardly and bulge 8' will ride over cam 8. Thus, the main spring of the watch will be securely protected from being overwound. This clutch arrangement consisting of the rod-shaped spring 11 and cam 8 has the advantage that spring 11 may be very easily made of the proper dimensions and resilient strength to determine very accurately the extent to which the main spring may be wound before spring 11 will yield and override cam 8 so that any further movement of ratchet wheel 1 will no longer be transmitted to wind the main spring until the watch has run for a certain length of time and ratchet wheel 1 has run idle for at least one revolution and bulge 8' on spring 11 is again able to take along the cam 8 to rewind the main spring.

Figure 4:
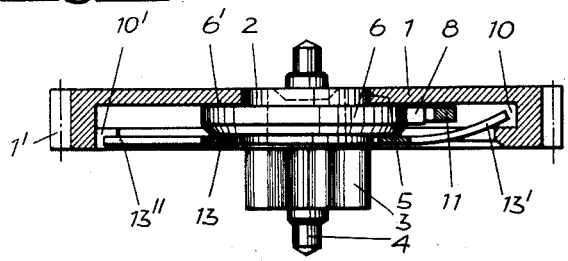
FIGURE 4 shows a cross section taken along line IV—IV of FIGURE 3.

The modification of the invention, as illustrated in FIGURES 3 and 4, differs from the embodiment according to FIGURES 1 and 2 by the fact that the clutch mechanism consisting of the rod-shaped spring 11 and the cam 8 on the flange 6 of hub 2 carrying the pinion 3 is combined with a friction clutch of the type as disclosed in my said Patent No. 2,928,231, previously referred to. This friction clutch is formed by the engagement of an annular surface 6' on flange 6 of hub 2 of pinion 3 with a corresponding annular surface on ratchet wheel 1, and by the provision of a star-shaped spring 13 which presses the two annular surfaces in the axial direction against each other. The central annular part of spring 13 engages against flange 6 on hub 2, while the outer ends of the radially extending arms 13' of this spring are inserted into the annular groove 10 in ratchet wheel 1 and engage under tension with the wall thereof. For inserting the outer ends of the spring arms 13' into groove 10, the wall thereof is provided with a notch 10', through which the end or ends of the rod-shaped spring 11 may also be inserted. After the ends of three of the spring arms 13' have been inserted one after the other through notch 10' and sprung into groove 10, the end of the fourth spring arm 13" will be allowed to remain in notch 10' and will then lock the entire spring 13, and thus also the rod-shaped spring 11, in a fixed position relative to ratchet wheel 1. This latter spring may be of the same design as that applied in the first embodiment of the invention according to FIGURES 1 and 2, except for the fact that it does not need to be secured to the ratchet wheel 1 by a pin 12 or the like since its end 11' will be in abutting engagement with one of the arms 13' of spring 13.

Also in this embodiment, the central bulge 8' of spring 11 engages with a cam 8 on flange 6 of hub 2 on pinion 3. Springs 11 and 13 are made with such forces so that the operation of the mechanism will be effective as combination of two clutches.

When the main spring is being wound by the oscillatory movement of the flyweight, as indicated diagrammatically in FIGURE 1, the ratchet wheel 1 in FIGURES 3 and 4 will be turned counterclockwise, as indicated by the arrow. As the result of the pressure exerted by the star-shaped spring 13 in the axial direction upon flange 6 of hub 2, pinion 3 will then be taken along to wind the main spring of the watch. Under the action of the star-shaped spring 13, the annular surface 6' of flange 6 and the corresponding annular inner surface of ratchet wheel 1 therefore engage with each other and form the two elements of a friction clutch. Spring 13 is made to produce a force of such strength that the two clutch elements 8 and 13 will start sliding relative to each other even before the main spring of the watch has been wound too tightly. Consequently, the instance can never arise that the main spring might be overwound because spring 13 might accidentally be made of a slightly greater strength than necessary with the result that the friction clutch might remain locked and the two annular clutch surfaces might not start sliding relative to each other until the fully-wound main spring finally releases the friction clutch and permits the two annular engaging surfaces thereof to slide relative to each other.

As soon as the frictional locking action produced by the star-shaped spring 13 discontinues at a time before the main spring is even sufficiently wound, pinion 3 will, however, be further taken along by the rotation of ratchet wheel 1 through the action of the rod-shaped spring 11 engaging with cam 8. An adjustment of spring 11 to have the necessary resilient strength to insure that it will take along the cam 8 as long as the main spring of the watch has not as yet been wound sufficiently but also to have the proper strength to insure that it will yield under the resistance of cam 8 and ride over the same as soon as the main spring has been wound sufficiently may be carried out much more easily than an adjustment of the strength of the star-shaped spring 13 so as to prevent any possible overwinding of the main spring which in any event would result in too fast a movement of the watch. Also, such an adjustment of the rod-shaped spring 11 may be carried out much more accurately prior to the assembly of the watch than a similar critical adjustment of the star-shaped spring 13. The additional clutch mechanism according to this invention which is formed by spring 11 and cam 8 may also be easily applied to a self-winding watch which is already provided with a friction clutch according to my mentioned copending application. In such event, it will merely be necessary to reduce the axial pressure exerted by the star-shaped spring 13 so that the two clutch mechanisms will properly cooperate with each other in the same manner as described above.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In a self-winding watch of the type having a mainspring, a shaft for winding said mainspring, a ratchet wheel rotatably mounted on said shaft, a flyweight mounted for oscillatory movement, and a pair of pawls connected to and actuated by said flyweight to rotate said ratchet wheel in only one direction, an overwind preventor interposed between said ratchet wheel and said shaft and comprising a rod-shaped spring connected to said ratchet wheel, and a cam projecting from said shaft and having a relatively acute vertex, said rod-shaped spring being arranged substantially in the direction of a secant of said ratchet wheel and having in its middle part a curvature the vertex of which is directed toward the axis of said shaft, said rod-shaped spring being of a shape to engage with and take along said cam to rotate said shaft and wind said mainspring when said ratchet wheel is being turned and of strength to yield to the resistance of said cam when said mainspring has been sufficiently wound while said ratchet wheel is being turned, and said vertex of said cam and said vertex of said rod-shaped spring being so shaped that when said rod-shaped spring is turned by said ratchet wheel about the axis of said shaft, said rod-shaped spring overruns said cam when the mainspring is sufficiently wound.

2. In a self-winding device as defined in claim 1, wherein said ratchet wheel has at one side a large central recess coaxial with said shaft, a pinion on said shaft adapted to wind said mainspring, said pinion having a hub disposed within said recess, said cam being secured to said hub, said rod-shaped spring being mounted within said recess.

References Cited in the file of this patent

UNITED STATES PATENTS

| | | |
|---|---|---|
| 2,563,112 | Hill et al. | Aug. 7, 1951 |
| 2,571,879 | Hill et al. | Oct. 16, 1951 |
| 2,637,987 | Hill et al. | May 12, 1953 |
| 2,696,073 | Langel | Dec. 7, 1954 |
| 2,700,868 | Feigel | Feb. 1, 1955 |
| 2,702,461 | Pfister | Feb. 22, 1955 |
| 2,716,875 | Hill et al. | Sept. 6, 1955 |
| 2,854,830 | Steinbrecker | Oct. 7, 1958 |

FOREIGN PATENTS

| | | |
|---|---|---|
| 550,602 | Germany | May 12, 1932 |
| 592,741 | France | May 7, 1925 |
| 749,550 | France | May 8, 1933 |